US011785023B2

(12) United States Patent
Moriya et al.

(10) Patent No.: US 11,785,023 B2
(45) Date of Patent: Oct. 10, 2023

(54) VEHICLE ABNORMALITY DETECTION DEVICE AND VEHICLE ABNORMALITY DETECTION METHOD

(71) Applicant: TOYOTA JIDOSHA KABUSHIKI KAISHA, Toyota (JP)

(72) Inventors: Tomokazu Moriya, Tokyo (JP); Takumaru Nagai, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 226 days.

(21) Appl. No.: 17/177,675

(22) Filed: Feb. 17, 2021

(65) Prior Publication Data

US 2021/0360008 A1 Nov. 18, 2021

(30) Foreign Application Priority Data

May 15, 2020 (JP) .................................. 2020-086331

(51) Int. Cl.
*H04L 9/40* (2022.01)
*H04L 67/12* (2022.01)

(52) U.S. Cl.
CPC ...... *H04L 63/1416* (2013.01); *H04L 63/0209* (2013.01); *H04L 63/1425* (2013.01); *H04L 67/12* (2013.01)

(58) Field of Classification Search
CPC ............. H04L 63/1416; H04L 63/0209; H04L 63/1425; H04L 67/12
See application file for complete search history.

(56) References Cited

U.S. PATENT DOCUMENTS

| 11,363,045 | B2* | 6/2022 | Torisaki | ............ H04L 12/40006 |
| 2018/0262466 | A1* | 9/2018 | Atad | .................... H04L 63/0209 |
| 2019/0104108 | A1* | 4/2019 | Rhee | .................... H04L 63/1425 |
| 2019/0260781 | A1* | 8/2019 | Fellows | ................. G06F 3/0486 |

FOREIGN PATENT DOCUMENTS

JP 2019-038331 A 3/2019

* cited by examiner

*Primary Examiner* — Bassam A Noaman
(74) *Attorney, Agent, or Firm* — Oliff PLC

(57) ABSTRACT

In a vehicle abnormality detection device, when a transmission and reception unit receives abnormality information of a first control device on an in-vehicle network configured by a plurality of layers via a firewall, an abnormality cause candidate acquisition unit acquires a candidate for a second control device that may cause the abnormality of the first control device. An abnormality information management unit manages the first control device and the second control device as abnormality cause control devices when the second control device in which an abnormality occurs before a time when the abnormality of the first control device is detected is detected from the candidate acquired by the abnormality cause candidate acquisition unit.

5 Claims, 5 Drawing Sheets

VEHICLE ABNORMALITY DETECTION DEVICE AND VEHICLE ABNORMALITY DETECTION METHOD

CROSS-REFERENCE TO RELATED APPLICATION

This application claims priority to Japanese Patent Application No. 2020-086331 filed on May 15, 2020, incorporated herein by reference in its entirety.

BACKGROUND

1. Technical Field

The disclosure relates to a vehicle abnormality detection device and a vehicle abnormality detection method.

2. Description of Related Art

Japanese Unexamined Patent Application Publication No. 2019-038331 (JP 2019-038331 A) discloses an electronic control device for identifying a vehicle control state. Specifically, the electronic control device is configured to accumulate monitoring data including at least either of control input data and execution content data when a preset monitoring precondition is satisfied. Further, when the electronic control device receives a data transmission request, the electronic control device is configured to transmit the accumulated monitoring data to an external device such that the external device can analyze a cause that results in a control output result using the control input data and the execution content data, etc.

SUMMARY

However, the technique described in JP 2019-038331 A can only detect that an abnormality has occurred on an in-vehicle network, and requires efforts to analyze the cause of the abnormality.

In consideration of the above fact, an object of the disclosure is to obtain a vehicle abnormality detection device and a vehicle abnormality detection method capable of efficiently analyzing the cause of an abnormality occurring on the in-vehicle network.

A first aspect of the present disclosure relates to a vehicle abnormality detection device that includes: a transmission and reception unit that receives, among a plurality of control devices on an in-vehicle network configured by a plurality of layers via a firewall, abnormality information of a first control device in which an abnormality is detected; an abnormality cause candidate acquisition unit that acquires a candidate for a second control device that has a possibility to cause the abnormality in the first control device received by the transmission and reception unit; and an abnormality information management unit that manages the first control device and the second control device as abnormality cause control devices when the second control device in which an abnormality occurs before a time when the abnormality of the first control device is detected is detected from the candidate acquired by the abnormality cause candidate acquisition unit.

In the vehicle abnormality detection device according to the first aspect, the in-vehicle network is configured by the plurality of layers via the firewall, and includes the plurality of control devices. Here, the transmission and reception unit receives the abnormality information of the first control device in which the abnormality is detected. Further, the abnormality cause candidate acquisition unit acquires a candidate for the second control device that has a possibility to cause the abnormality.

Further, the abnormality information management unit manages the first control device and the second control device as abnormality cause control devices when the second control device in which an abnormality occurs before a time when the abnormality of the first control device is detected is detected from the candidate acquired by the abnormality cause candidate acquisition unit. In this processing, the abnormality information management unit manages the first control device and the second control device as the abnormality cause control device. Accordingly, the control device that causes the abnormality can be easily identified.

In the vehicle abnormality detection device according to the first aspect of the disclosure, a third control device as a new abnormality may cause control device when the third control device in which an abnormality occurs before a time when the abnormality of the abnormality cause control devices is detected is detected.

In the vehicle abnormality detection device according to the above configuration, the second control device in which an abnormality occurs before the time when the abnormality of the first control device is detected is managed as the abnormality cause control device, and the third control device in which an abnormality occurs before the time when the abnormality of the abnormality cause control device is detected is managed as a new abnormality cause control device. With this configuration, the control device that triggers the abnormality can be easily identified.

In the vehicle abnormality detection device according to the above configuration, the in-vehicle network may be configured to include a first layer provided with an external communication device, and the abnormality cause candidate acquisition unit may acquire, as the candidate, a control device in the same layer as the first control device and a control device connecting a layer adjacent to a first layer side with respect to the same layer and the same layer.

In the vehicle abnormality detection device according to the above configuration, the control device adjacent to the first layer side provided with the external communication device is acquired as a candidate, which makes it possible to promptly detect the abnormality occurring due to the external attack.

The vehicle abnormality detection device according to the above configuration, the vehicle abnormality detection device may further include an attack identification unit that identifies that an external attack occurs when the abnormality of the abnormality cause control devices managed by the abnormality information management unit is an abnormality relating to external communication.

In the vehicle abnormality detection device according to the above configuration, the attack identification unit identifies the external attack, which makes it possible to take countermeasures against or recover from the attack promptly.

In the vehicle abnormality detection device according to the above configuration, the vehicle may be provided with a module that realizes functions of the transmission and reception unit, the abnormality cause candidate acquisition unit, and the abnormality information management unit.

In the vehicle abnormality detection device according to the above configuration, occurrence of the attack can be quickly detected as compared with the configuration in which the module is provided outside the vehicle.

A second aspect of the present disclosure relates to a vehicle abnormality detection method that includes: a reception step of receiving information of a first control device in which an abnormality is detected on an in-vehicle network including a plurality of control devices and configured by a plurality of layers; an abnormality cause candidate acquisition step of acquiring a candidate for a second control device that has a possibility to cause the abnormality of the first control device received in the reception step; and an abnormality information management step of managing the second control device as an abnormality cause control device when the second control device in which an abnormality occurs before a time when the abnormality of the first control device is detected is detected from the candidate acquired by the abnormality cause candidate acquisition unit.

As described above, with the vehicle abnormality detection device and the vehicle abnormality detection method according to the disclosure, the cause of the abnormality occurring on the in-vehicle network can be efficiently analyzed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A vehicle abnormality detection device 10 (hereinafter appropriately referred to as "abnormality detection device 10") according to a first embodiment will be described with reference to the drawings.

Figure 1:
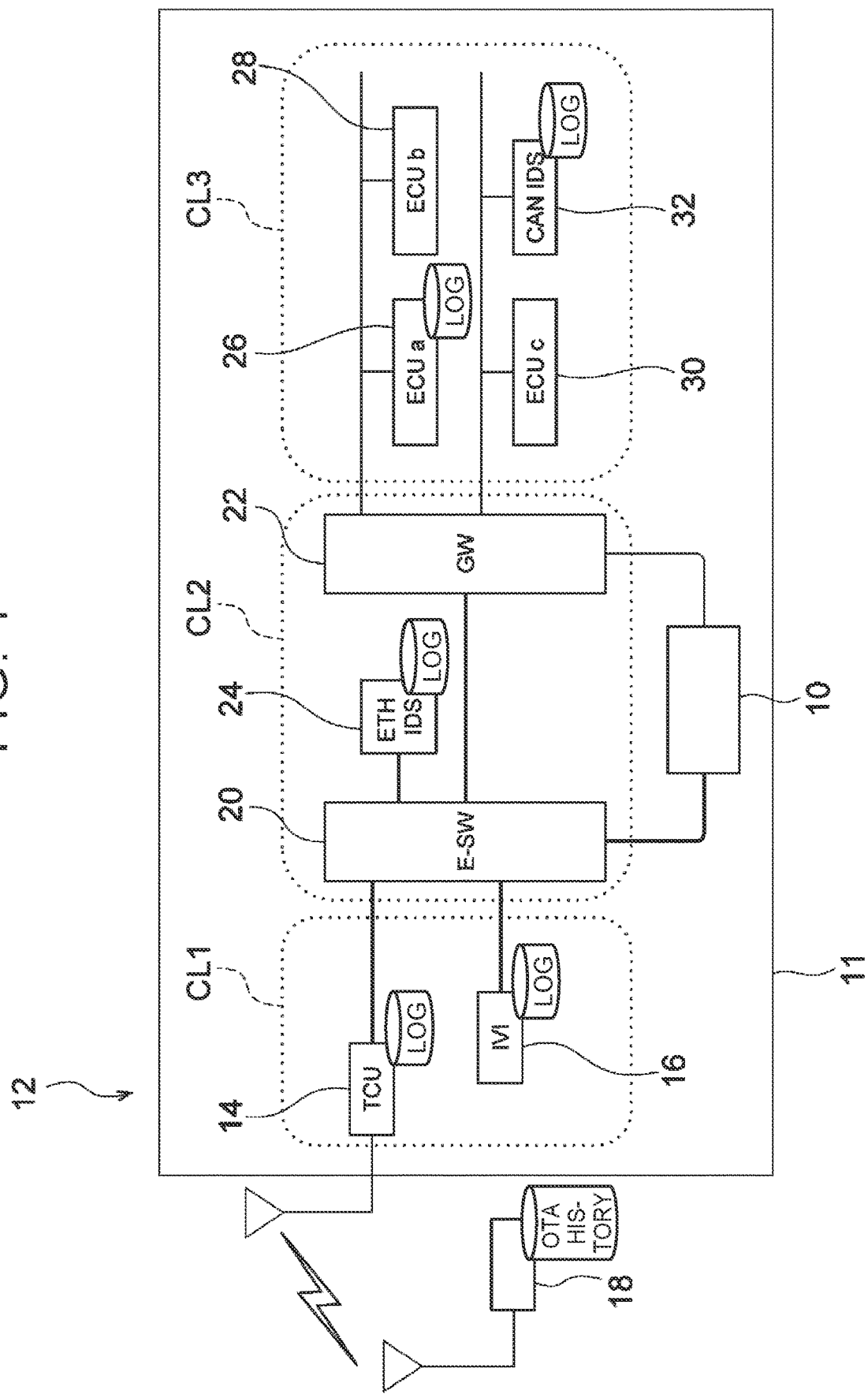
FIG. 1 is a block diagram showing an overall configuration of an in-vehicle network including a vehicle abnormality detection device according to a first embodiment.

FIG. 1 shows the overall configuration of an in-vehicle network 12 to which the abnormality detection device 10 is applied. The in-vehicle network 12 is configured to have a plurality of layers via a firewall. In the first embodiment, the in-vehicle network 12 is configured by three layers of a first layer CL1, a second layer CL2, and a third layer CL3, as an example.

The first layer CL1 is the outermost layer, and is provided with a control device having an external communication device. In the first embodiment, as an example, the first layer CL1 includes a telematics communication unit (TCU) 14 and an in-vehicle infotainment (IVI) 16. Further, each of the TCU 14 and the IVI 16 is a type of an electronic control unit (ECU) that is a control device, and includes a storage area for recording a host log of the own ECU. The IVI 16 refers to a system that provides information and entertainment by means of an in-vehicle IT device, etc. Further, the TCU 14 is configured to be wirelessly communicable with an external center 18 of a vehicle 11. The center 18 includes a storage area for storing an over the air (OTA) history that is a history of data transmission to and reception from the vehicle 11.

The second layer CL2 includes an Ethernet switch 20, a gateway 22, and an Ethernet intrusion detection system (IDS) 24. The first layer CL1 and the second layer CL2 are connected to each other via the Ethernet switch 20 that serves as a firewall. The Ethernet switch 20, the gateway 22, and the Ethernet IDS 24 are all ECUs. The Ethernet switch 20, the TCU 14, and the IVI 16 are each connected by an Ethernet (registered trademark) communication line.

Further, the Ethernet switch 20 and the Ethernet IDS 24 are connected to each other by an Ethernet communication line. The Ethernet switch 20 and the gateway 22 are connected to each other by an Ethernet communication line. Further, the abnormality detection device 10 according to the first embodiment is connected to the Ethernet switch 20 and the gateway 22. Specifically, the abnormality detection device 10 and the Ethernet switch 20 are connected to each other by an Ethernet communication line. The abnormality detection device 10 and the gateway 22 are connected to each other by a controller area network (CAN) communication line. Details of the abnormality detection device 10 will be described later.

The third layer CL3 includes an ECU a26, an ECU b28, an ECU c30, and a CAN IDS 32, which are connected to the gateway 22 by a CAN communication line. That is, the second layer CL2 and the third layer CL3 are connected to each other via the gateway 22 that serves as a firewall.

The ECU a26, the ECU b28, and the ECU c30 are ECUs that execute different vehicle controls. In particular, the ECU a26 is a high-performance ECU that executes traveling control, and includes a storage area for recording a host log of the own ECU.

Hardware Configuration of Abnormality Detection Device 10

Figure 2:
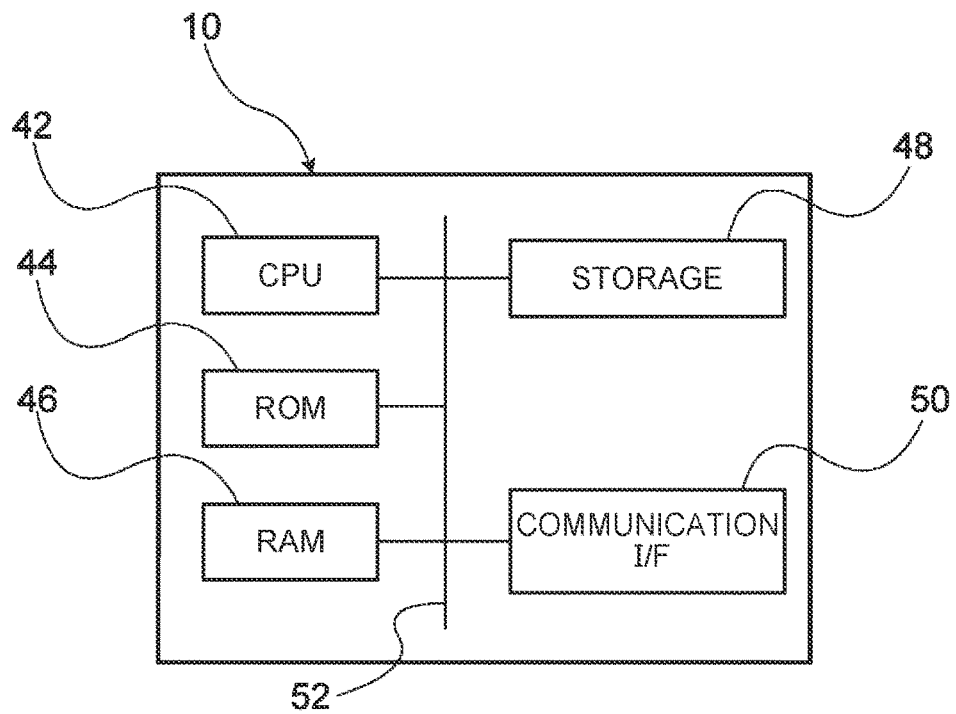
FIG. 2 is a block diagram showing a hardware configuration of the vehicle abnormality detection device according to the first embodiment.

FIG. 2 shows a block diagram of a hardware configuration of the abnormality detection device 10. As shown in FIG. 2, the abnormality detection device 10 includes a central processing unit (CPU) 42, a read only memory (ROM) 44, a random access memory (RAM) 46, a storage 48, and a communication interface 50. Each configuration is communicably connected to each other via a bus 52. The CPU 42 is an example of a processor, and the RAM 46 is an example of a memory.

The CPU 42 is a central processing unit that executes various programs and controls each unit. That is, the CPU 42 reads the program from the ROM 44 or the storage 48, and executes the program using the RAM 46 as a work area. The CPU 42 controls each of the above configurations and executes various types of arithmetic processing in accordance with the program recorded in the ROM 44 or the storage 48.

The ROM 44 stores various programs and various data. The RAM 46 temporarily stores the program or data as a work area. The storage 48 is composed of a hard disk drive (HDD) or a solid state drive (SSD), and stores various programs including an operating system and various data. In the first embodiment, the ROM 44 stores an abnormality detection program, etc., for executing the abnormality detection processing.

The communication interface 50 is an interface for the abnormality detection device 10 to communicate with another control device via a computer network. For example, standards such as Ethernet and CAN are used for the communication interface 50.

Functional Configuration of Vehicle Abnormality Detection Device 10

The vehicle abnormality detection device 10 realizes various functions using the above hardware resources. The functional configuration realized by the vehicle abnormality detection device 10 will be described with reference to FIG. 3.

Figure 3:
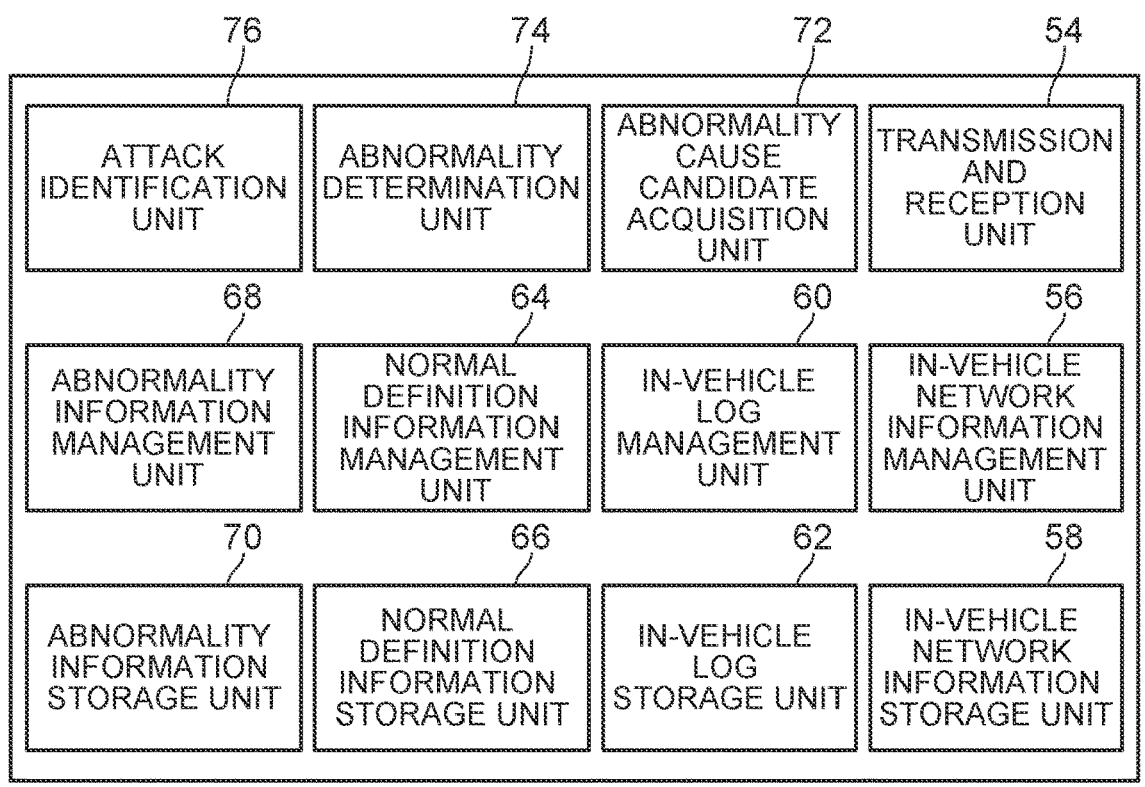
FIG. 3 is a block diagram showing a functional configuration of the vehicle abnormality detection device according to the first embodiment.

As shown in FIG. 3, the vehicle abnormality detection device 10 includes functional configurations such as a transmission and reception unit 54, an in-vehicle network information management unit 56, an in-vehicle network information storage unit 58, an in-vehicle log management unit 60, an in-vehicle log storage unit 62, a normal definition information management unit 64, a normal definition information storage unit 66, an abnormality information management unit 68, an abnormality information storage unit 70, an abnormality cause candidate acquisition unit 72, an abnormality determination unit 74, and an attack identification unit 76. Each functional configuration is realized in such a manner that the CPU 42 reads and executes the program stored in the ROM 44 or the storage 48.

The transmission and reception unit 54 transmits and receives logs and analysis results of each ECU on the in-vehicle network 12 via Ethernet and CAN, etc. Further, the transmission and reception unit 54 is configured to receive the abnormality information of the ECU in which an abnormality is detected among the ECUs constituting the in-vehicle network 12. Further, the transmission and reception unit 54 has a function of transmitting, to the center 18, abnormality information managed by the abnormality information management unit 68 and the event specified as an external attack by the attack identification unit 76.

The in-vehicle network information management unit 56 manages information relating to the configuration of the in-vehicle network 12 and information on logs recorded by each ECU on the in-vehicle network 12. Further, the in-vehicle network information storage unit 58 is a function of storing information of the in-vehicle network 12. In the first embodiment, the in-vehicle network information storage unit 58 stores configuration information and ECU information. The configuration information is information relating to the number of layers of the in-vehicle network 12 and the ECU connected to each layer. Further, the ECU information is information relating to a protocol handled by each ECU and the log information recorded by each ECU. Therefore, it can be seen with reference to the ECU information that, for example, an external communication log, a system audit log, and a failure code log are recorded in the TCU 14. Then, the in-vehicle network information management unit 56 updates the information stored in the in-vehicle network information storage unit 58 when the configuration information and the ECU information are changed.

The in-vehicle log management unit 60 acquires and manages the log recorded by the ECU on the in-vehicle network 12. Further, the in-vehicle log storage unit 62 is a function of storing a log acquired by the in-vehicle log management unit 60, and also stores the OTA history of the center 18 as a log. The in-vehicle log management unit 60 may acquire the log that is automatically transmitted by each ECU. Further, the in-vehicle log management unit 60 may acquire the log as the in-vehicle log management unit 60 commands each ECU to transmit the log. Here, the configuration is adopted such that synchronized clocks in the vehicle stamp time to all the logs. For example, a log with a time stamp is recorded as an external communication log of the TCU 14, and the external communication log is stored in the in-vehicle log storage unit 62.

The normal definition information management unit 64 manages the normal definition information of the log recorded by each ECU. Further, the normal definition information storage unit 66 stores the normal definition information for each ECU. The normal definition information mentioned herein is a rule regarding normal definition and a white list, for example. The normal definition information storage unit 66 stores the normal definition for various logs of the ECU described in the ECU information stored in the in-vehicle network information storage unit 58. That is, the normal definition information storage unit 66 stores the normal definition for each of in-vehicle logs stored in the in-vehicle log storage unit 62. Therefore, when the in-vehicle network information management unit 56 updates the ECU information, the log information managed by the in-vehicle log management unit 60 is also updated. The normal definition information management unit 64 updates the normal definition information corresponding to the log.

The abnormality information management unit 68 is a function of managing the abnormality information detected in the vehicle 11. For example, the abnormality information management unit 68 manages detection results of the Ethernet IDS 24 and the CAN IDS 32. In addition, the abnormality information management unit 68 manages an event that deviates from the normal definition among the in-vehicle log as the abnormality information. In this processing, the abnormality information is collectively managed in the unit of analysis specific to the attack. The abnormality information storage unit 70 is a function of storing the abnormality information in the vehicle 11, and stores an abnormality notification from the ECU on the in-vehicle network 12.

The abnormality cause candidate acquisition unit 72 acquires, as abnormality cause ECUs, candidates for another ECU (second ECU) that may cause an abnormality of one ECU (first ECU) received by the transmission and reception unit 54. Specifically, the abnormality cause candidate acquisition unit 72 acquires, as the abnormality cause ECUs, the ECU in the same layer as the first ECU and the ECU connecting the layer adjacent to the same layer on the first layer CL1 side and the same layer. For example, in FIG. 1, when the transmission and reception unit 54 receives the abnormality information from the CAN IDS 32, the abnormality cause candidate acquisition unit 72 acquires the ECU a26 that is in the same layer as the CAN IDS 32 as the abnormality cause ECU. Further, the abnormality cause candidate acquisition unit 72 acquires, as the abnormality cause ECU, the gateway 22 that connects the second layer CL2 adjacent to the CAN IDS 32 on the first layer CL1 side and the third layer CL3. The abnormality cause candidate acquisition unit 72 according to the first embodiment does not acquire the ECU b28 and the ECU c30 that do not have the log as the candidates for the abnormality cause even when the ECUs b28, c30 are in the same layer as the CAN IDS 32.

The abnormality determination unit 74 compares the in-vehicle logs with the normal definition information, and determines that an event deviating from the normal definition information is abnormal among the in-vehicle logs. That is, the abnormality determination unit 74 acquires the in-vehicle log stored in the in-vehicle log storage unit 62 and the normal definition information stored in the normal definition information storage unit 66, and compares the in-vehicle log with the normal definition information so as to determine whether the event is abnormal. When the abnormality determination unit 74 determines that the event is abnormal, the abnormality information management unit 68 manages the information as the abnormality information.

Here, when an abnormality has occurred in another ECU (second ECU) before the time when an abnormality of one ECU (first ECU) is detected from the candidates acquired by the abnormality cause candidate acquisition unit 72, the abnormality information management unit 68 manages the first ECU and the second ECU as the abnormality cause ECUs.

Further, when an abnormality has occurred in yet another ECU (third ECU) before the time when the abnormality of the second ECU is detected in the case where the abnormality information management unit 68 manages the first ECU and the second ECU as the abnormality cause ECUs, the abnormality information management unit 68 manages the third ECU as a new abnormality cause ECU. That is, the abnormality information management unit 68 collectively stores, in the abnormality information storage unit 70, the abnormal ECUs as the abnormality cause ECUs retroactively from the time of the abnormality information of the first ECU received by the transmission and reception unit 54.

The attack identification unit 76 identifies an external attack using abnormality detection by the Ethernet IDS 24 and the CAN IDS 32 as a trigger. Specifically, the attack identification unit 76 identifies that an external attack occurs when the abnormality of the abnormality cause ECU managed by the abnormality information management unit 68 is an abnormality relating to external communication.

Actions

Next, actions of the first embodiment will be described.

Example of Abnormality Detection Processing

Figure 4:
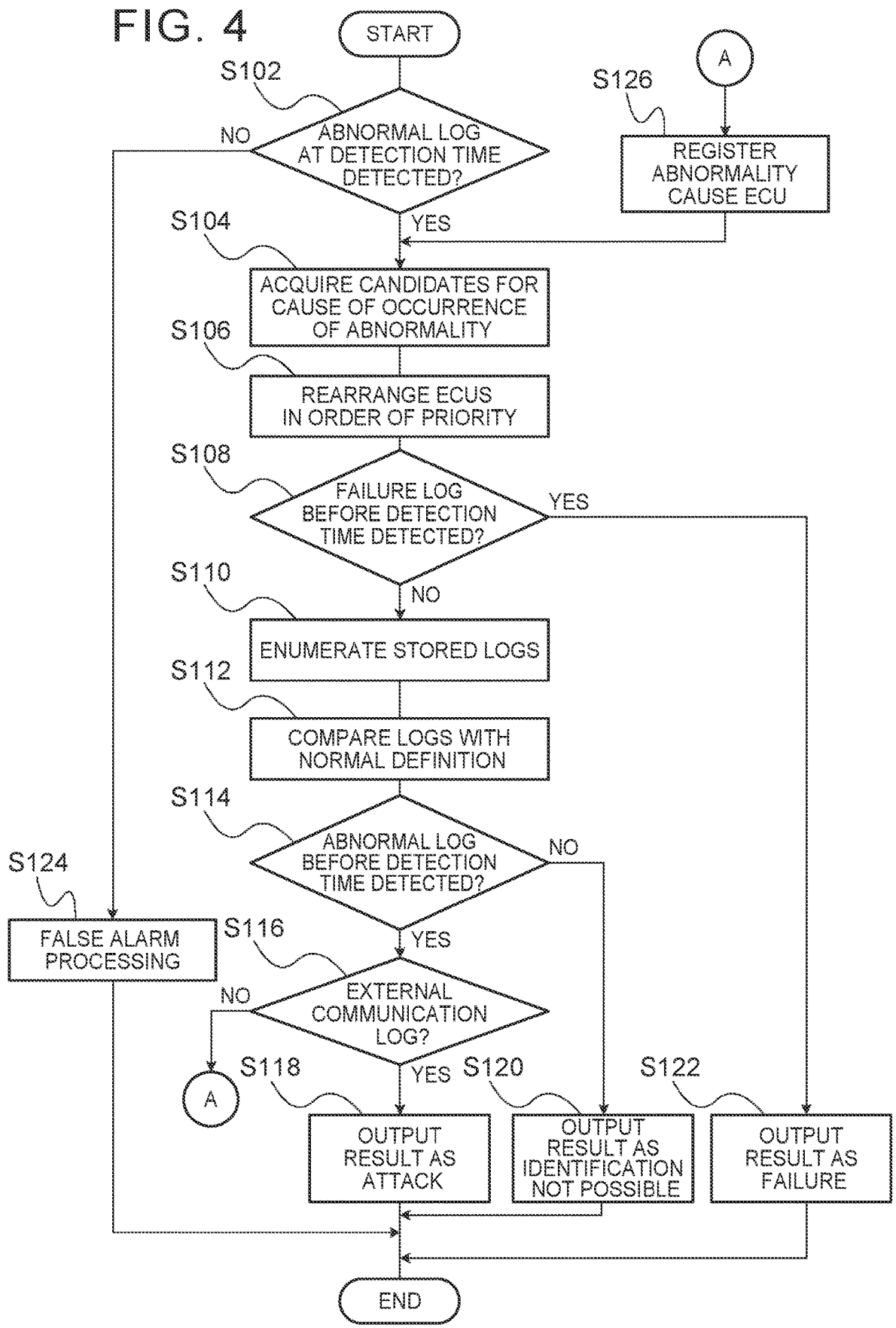
FIG. 4 is a flowchart showing an example of a procedure of abnormality detection processing executed by the vehicle abnormality detection device according to the first embodiment.

FIG. 4 is a flowchart showing an example of a procedure of the abnormality detection processing executed by the vehicle abnormality detection device 10. The CPU 42 executes the abnormality detection processing by reading a program from the ROM 44 or the storage 48 and executing the program deployed to the RAM 46. Further, the abnormality detection processing according to the first embodiment is executed when the transmission and reception unit 54 receives the abnormality information (reception step).

As shown in FIG. 4, the CPU 42 determines in step S102 whether the abnormality information is actually recorded in the log. Specifically, the CPU 42 confirms whether any abnormal log is included in the in-vehicle logs stored in the in-vehicle log storage unit 62 by referring to the in-vehicle log at the time when the abnormality occurs. When the CPU 42 confirms in step S102 that there is the abnormal log, the CPU 42 proceeds to the processing in step S104.

On the other hand, when the CPU 42 confirms in step S102 that there is no abnormal log at the time when the abnormality occurs, the CPU 42 proceeds to the processing in step S124. The CPU 42 executes false alarm processing in step S124. That is, the CPU 42 leaves a log indicating that a false alarm has been made. After that, the CPU 42 ends the abnormality detection processing.

When the CPU 42 confirms that there is the abnormality log, the CPU 42 acquires, in step S104, the ECUs as candidates for cause of the occurrence of the abnormality (abnormality cause candidate acquisition step). Specifically, the CPU 42 acquires candidates of another ECU (second ECU) that may cause an abnormality of one ECU (first ECU) received by the transmission and reception unit 54 as the abnormality cause ECUs, using the function of the abnormality cause candidate acquisition unit 72. Specifically, the CPU 42 acquires, as the abnormality cause ECU, the ECU in the same layer as the first ECU and the ECU connecting the layer adjacent to the same layer on the first layer CL1 side and the same layer.

Next, in step S106, the CPU 42 rearranges the ECUs in descending order of analysis priority. Specifically, the CPU 42 rearranges a plurality of the abnormality cause ECUs acquired by the abnormality cause candidate acquisition unit 72 based on a predetermined rule. The predetermined rule mentioned herein is to weight each of the abnormality cause ECUs and rearrange the ECUs in accordance with the magnitude of numerical values for the weighting. For example, the abnormality cause ECUs may be weighted such that the numerical value for the weighing increases from the third layer CL3 toward the first layer CL1. Further, the numerical values for the weighting may be set such that the ECU provided with an external communication device has a larger numerical value for the weighing than that of the ECU not provided with the external communication device. Further, the numerical values for the weighting may be set such that the high functional ECU has a larger numerical value.

Subsequently, the CPU 42 determines in step S108 whether there is a failure log sequentially for the ECUs rearranged in order of analysis priority before the time when occurrence of the abnormality is detected. Specifically, the CPU 42 refers to the log information of each ECU stored in the in-vehicle network information storage unit 58. When the CPU 42 detects the failure log before the time when occurrence of the abnormality is detected, the CPU 42 proceeds to the processing in step S122. The CPU 42 outputs an analysis result to the center 18 indicating that the abnormality information received by the transmission and reception unit 54 in step S122 is generated due to a failure. In this processing, the CPU 42 notifies the center 18 of a failure code. After that, the CPU 42 ends the abnormality detection processing.

On the other hand, when the CPU 42 does not detect any failure log before the time when occurrence of the abnormality is detected, the CPU 42 proceeds to the processing in step S110 and enumerates all the in-vehicle logs except for the failure log for each of the ECUs rearranged in order of priority.

Next, the CPU 42 compares the in-vehicle logs enumerated in step S112 with the normal definition. Specifically, the CPU 42 sequentially compares the in-vehicle logs with the normal definition information using the function of the abnormality determination unit 74.

In step S114, the CPU 42 determines whether there is any abnormality log before the time when occurrence of the abnormality is detected. Specifically, the CPU 42 compares the in-vehicle logs with the normal definition in step S112. When a log deviating from the normal definition is confirmed, the CPU 42 proceeds to step S114 and determines that there is an abnormality, and proceeds to the processing in step S116. That is, in step S112, when the abnormality log is confirmed, the processing of comparing the in-vehicle log with the normal definition is terminated. The processing in step S116 will be described later.

When the CPU 42 determines in step S114 that there is no abnormality log before the time when occurrence of the abnormality is detected, that is, when the CPU 42 does not detect any abnormality log as a result of comparing all the in-vehicle logs enumerated in step S112 with the normal definition, the CPU 42 proceeds to the processing in step S120.

The CPU 42 outputs the analysis result to the center 18 indicating that the cause of the abnormality received by the transmission and reception unit 54 in step S120 cannot be determined. In this processing, the CPU 42 notifies the center 18 of the information of the in-vehicle logs compared with the normal definition in step S112 in order to hand over the analysis to a person. After that, the CPU 42 ends the abnormality detection processing.

On the other hand, when the CPU 42 proceeds to the processing in step S114 and determines that there is an abnormality, the CPU 42 determines in step S116 whether the log is a log of the external communication. Specifically, when the abnormality log detected in step S114 is a log related to the external communication, the CPU 42 proceeds to the processing in step S118.

In step S118, the CPU 42 identifies that the abnormality information received by the transmission and reception unit 54 is an external attack using the function of the attack identification unit 76, and outputs the analysis result to the center 18. In this processing, the CPU 42 notifies the center 18 of a set of abnormality information used for the analysis. After that, the CPU 42 ends the abnormality detection processing.

Specifically, when the abnormality log detected in step S116 is not a log relating to the external communication, the CPU 42 proceeds to the processing in step S126. The CPU 42 manages the ECU having the abnormality log detected in step S114 as a new abnormality cause ECU using the function of the abnormality information management unit 68 in step S126 (abnormal information management step). The CPU 42 executes transition processing to step S104 with respect to the new abnormality cause ECU.

As described above, in the first embodiment, when there is another ECU (second ECU) in which the abnormality has occurred before the time when the abnormality of one ECU (first ECU) is detected among the candidates acquired by the abnormality cause candidate acquisition unit 72, the second ECU is managed as the abnormality cause ECU (refer to step S126). In this processing, the abnormality information management unit 68 manages the first ECU and the second ECU as the abnormality cause ECUs, thereby easily identifying the ECU that causes occurrence of the abnormality. Consequently, recovery from the abnormality can be performed efficiently.

Further, according to the first embodiment, when another ECU (third ECU) in which an abnormality has occurred before the abnormality detection time is detected in step S114 with respect to the ECU managed as the new abnormality cause ECU in step S126, the third ECU is managed as a new abnormality cause ECU. Consequently, the ECU that causes the abnormality can be analyzed retroactively, and the ECU that causes the abnormality can be easily identified.

Further, according to the first embodiment, when the abnormal log is a log relating to the external communication in the processing of step S116, the attack identification unit 76 identifies that the abnormality is an attack. Consequently, information indicating relevance with the external attack can be collected.

Furthermore, according to the first embodiment, the ECU adjacent on the first layer side having the external communication device is acquired as a candidate in step S104, which makes it possible to promptly identify the abnormality occurring due to the external attack. As described above, according to the first embodiment, the cause of the abnormality occurring on the in-vehicle network can be efficiently analyzed.

In step S118 according to the first embodiment, the abnormality information received by the transmission and reception unit 54 is identified as an external attack and the analysis result is output to the center 18. In addition to this, a notification of the degree of influence of the attack may be sent to the center 18. In this processing, when the abnormality information first received by the transmission and reception unit 54 does not indicate an abnormality in the third layer CL3 (an abnormality in the CAN layer), whether an abnormality occurs in the CAN layer may be checked. When the abnormality log is detected, a notification of the degree of influence due to the attack may be sent to the center 18. When the abnormality log is not detected, a notification indicating that the degree of influence is unknown may be sent to the center 18.

Second Embodiment

A vehicle abnormality detection device 80 (hereinafter appropriately referred to as "abnormality detection device 80") according to a second embodiment will be described with reference to FIG. 5. The same components as those in the first embodiment are denoted by the same reference numerals, and the description thereof will be omitted as appropriate.

In the first embodiment, the vehicle 11 includes the vehicle abnormality detection device 10 (module) that realizes the functions of the transmission and reception unit 54, the abnormality cause candidate acquisition unit 72, and the abnormality information management unit 68. On the contrary, in the second embodiment, the module is provided outside the vehicle 11, which makes a difference from the first embodiment.

Figure 5:
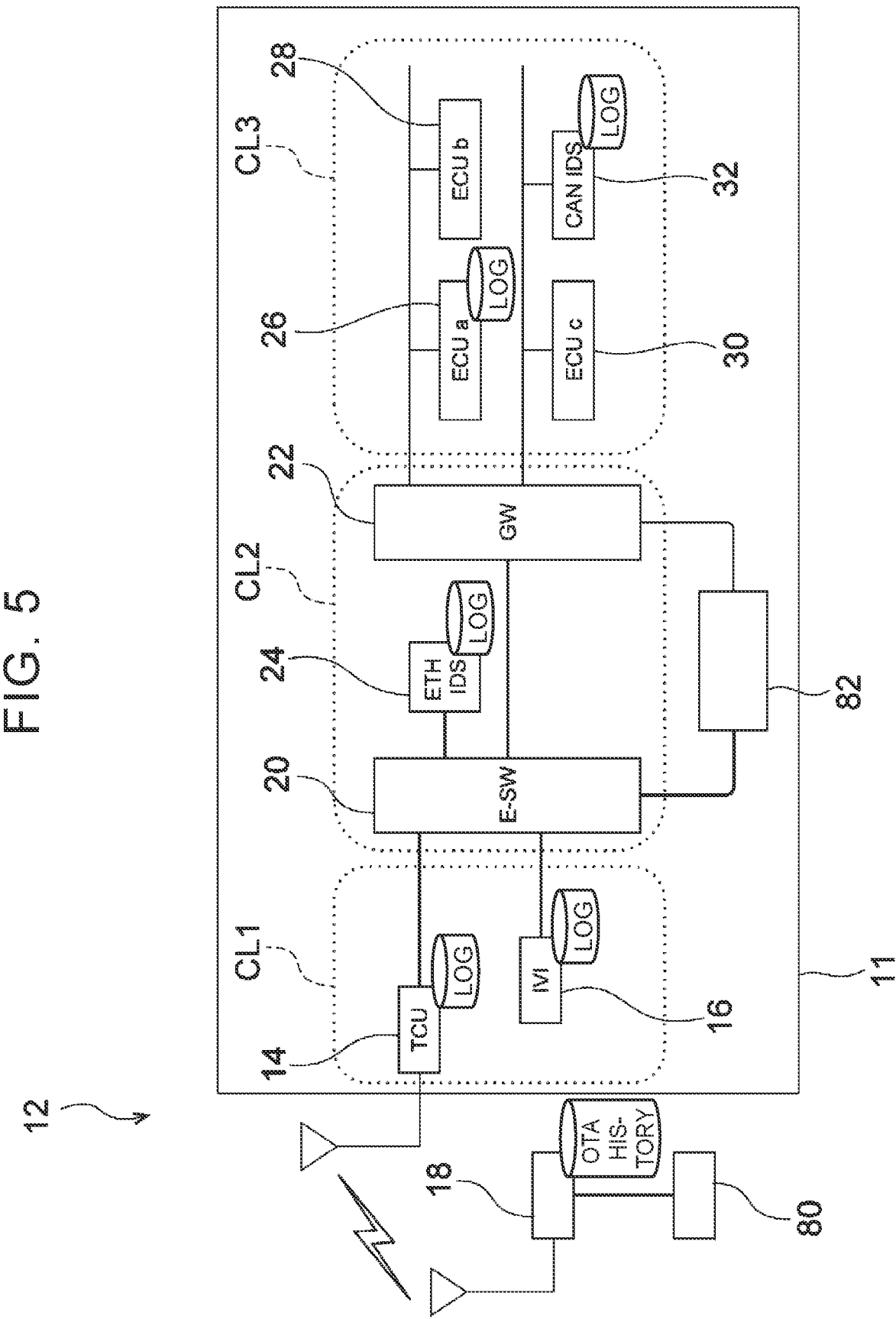
FIG. 5 is a block diagram showing an overall configuration of an in-vehicle network including a vehicle abnormality detection device according to a second embodiment.

As shown in FIG. 5, the abnormality detection device 80 according to the second embodiment is connected to the center 18. The abnormality detection device 80 has the same configuration as the abnormality detection device 10 according to the first embodiment. That is, the abnormality detection device 80 has the functional configuration shown in FIG. 3.

Further, the in-vehicle network 12 is provided with a temporary storage unit 82. The temporary storage unit 82 has the functions of the in-vehicle log storage unit 62 and the abnormality information storage unit 70.

Actions

Next, actions of the second embodiment will be described.

In the second embodiment, the abnormality detection device 80 is provided outside the vehicle 11. Therefore, the analysis is performed using external resources of the vehicle 11. In addition, the data required for analysis is transmitted from the TCU 14, etc. on the vehicle side. With this configuration, the use of resources on the vehicle side can be suppressed as compared with the first embodiment. Other actions are the same as in the first embodiment.

When the vehicle 11 and the center 18 cannot communicate with each other, the temporary storage unit 82 functions as a buffer for the data notified by the vehicle 11 by means of push notification.

Third Embodiment

A vehicle abnormality detection device 90 (hereinafter appropriately referred to as "abnormality detection device 90") according to a third embodiment will be described with reference to FIG. 6. The same components as those in the first embodiment are denoted by the same reference numerals, and the description thereof will be omitted as appropriate.

Figure 6:
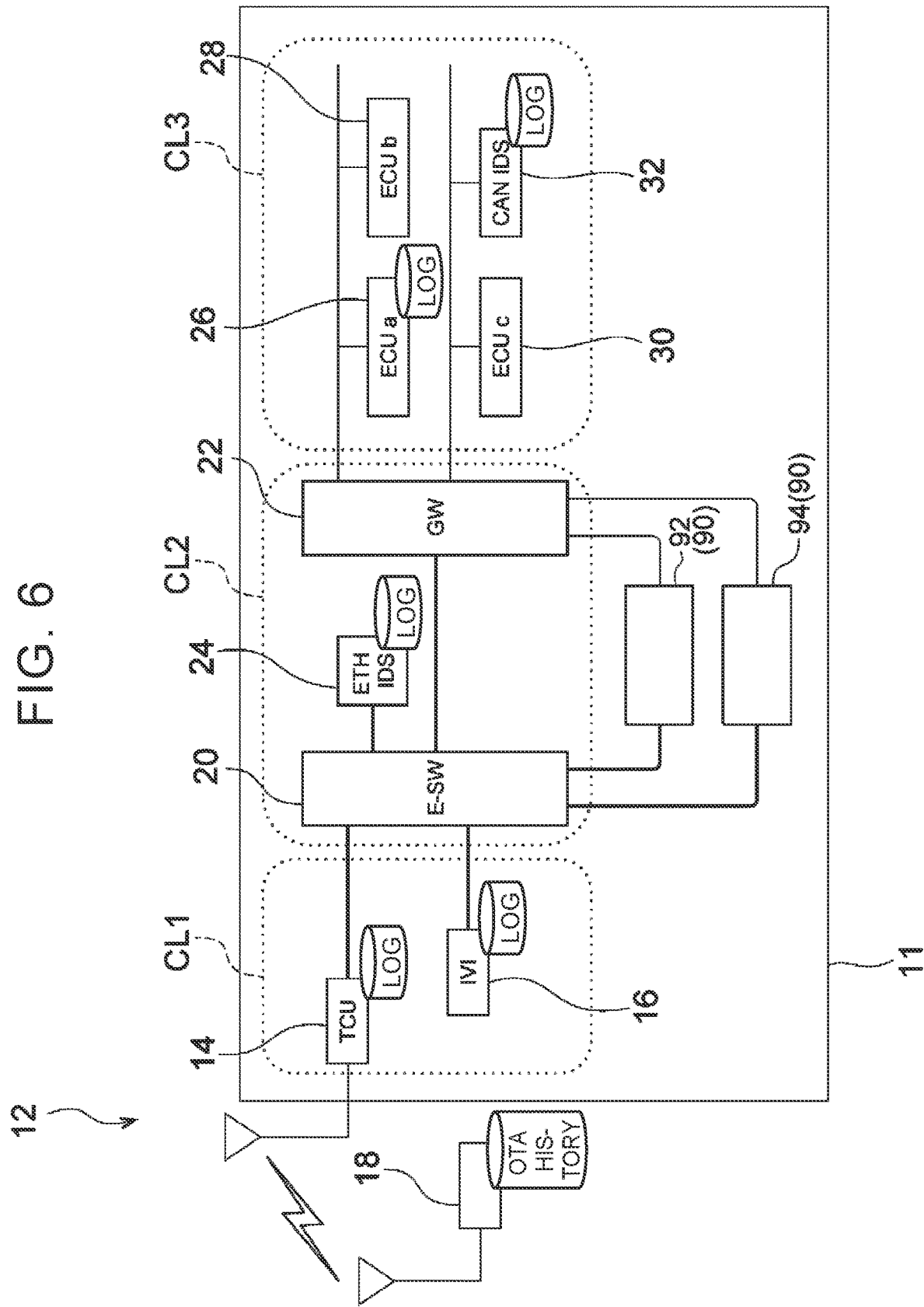
FIG. 6 is a block diagram showing an overall configuration of an in-vehicle network including a vehicle abnormality detection device according to a third embodiment.

As shown in FIG. 6, the abnormality detection device 90 includes a first detection device 92 and a second detection device 94 connected to the Ethernet switch 20 and the gateway 22. The first detection device 92 and the second detection device 94 each have the same configuration as the abnormality detection device 10 according to the first embodiment. That is, each of the first detection device 92 and the second detection device 94 has the functional configuration shown in FIG. 3.

Actions

Next, actions of the third embodiment will be described.

According to the third embodiment, even when one of the first detection device 92 and the second detection device 94 fails or becomes abnormal, the other of the first detection device 92 and the second detection device 94 can detect the failure or the abnormality.

Further, when the detection results detected by the first detection device 92 and the second detection device 94 are different from each other, it indicates that one of the detection devices fails or is abnormal. Therefore, the center 18 and the vehicle 11 do not accept a command from the abnormality detection device 90. With this configuration, even when the first detection device 92 or the second detection device 94 becomes abnormal, the in-vehicle network 12 can be satisfactorily protected from the external attack.

In the third embodiment, some functions may be shared in order to suppress used resources from being doubled as those of the abnormality detection device 10 according to the first embodiment. For example, the in-vehicle network information storage unit 58, the in-vehicle log storage unit 62, the normal definition information storage unit 66, and the abnormality information storage unit 70 that constitute the first detection device 92 may be shared with the second detection device 94.

Although the embodiments and modifications have been described above, it is needless to say that the disclosure can be implemented in various forms without departing from the gist of the disclosure. For example, according to the above embodiments, the in-vehicle network 12 is configured by the first layer CL1, the second layer CL2, and the third layer CL3. However, the disclosure is not limited to this. For example, the four layers or more layers may be provided. Even in this case, the adjacent layers are connected via a firewall.

Further, according to the above embodiments, the ECU having the external communication device is provided only in the first layer CL1. However, the disclosure is not limited to this. For example, the ECU having the external communication device may be provided in the second layer CL2 that is a layer lower than the first layer CL1. The ECU as described above is set to have a higher priority than other ECUs in the abnormality detection processing in step S106.

Further, various processors other than the CPU may execute the abnormality detection processing that is executed by the CPU 42 in the embodiments above by reading the software (program). The processor in this case includes an exclusive electric circuit that is a processor including a circuit configuration exclusively designed for executing specific processing, such as programmable logic device (PLD) having a circuit configuration that can be changed after the manufacture including a field-programmable gate array (FPGA), and an application specific integrated circuit (ASIC). Further, the abnormality detection processing may be executed by one of the various processors above, or a combination of two or more processors of the same type or different types (for example, a plurality of FPGAs and a combination of a CPU and an FPGA). Further, a hardware configuration of the various processors is, more specifically, an electric circuit in which circuit elements such as semiconductor elements are combined.

What is claimed is:

1. A vehicle abnormality detection device, comprising a memory and a processor configured to:
    transmit and receive, among a plurality of control devices on an in-vehicle network configured by a plurality of layers via a firewall, abnormality information of a first control device in which an abnormality is detected by the vehicle abnormality detection device,
    wherein the vehicle abnormality detection device stores configuration information identifying electronic devices disposed in each layer of the plurality of layers;
    acquire a candidate for a second control device that has a possibility to cause the abnormality in the first control device received by the processor, the first control device and the second control device being disposed within a second layer of the layers;
    manage the first control device and the second control device as abnormality cause control devices when an abnormality occurs in the second control device before a time when the abnormality of the first control device is detected by the vehicle abnormality detection device; and
    acquire, in response to determining that the abnormality occurring in the second control device is not related to external communication, a candidate for a third control device, disposed within a first layer of the layers adjacent to the second layer, that has a possibility to cause the abnormality in the abnormality cause control devices,
    when the third control device undergoes an abnormality before a time when the abnormality of the abnormality cause control devices is detected by the vehicle abnormality detection device, the processor also manages the third control device as a new abnormality cause control device,
    wherein the third control device connects the first layer and the second layer,
    wherein the vehicle abnormality detection device includes a first vehicle abnormality detection device, and a second vehicle abnormality detection device with a same configuration as the first vehicle abnormality detection device, and
    one of the first vehicle abnormality detection device and the second vehicle abnormality detection device is determined as being abnormal in response to different detection results being produced by the first vehicle abnormality detection device and the second vehicle abnormality detection device.

2. The vehicle abnormality detection device according to claim 1, the processor being further configured to identify that an external attack occurs when the abnormality of the abnormality cause control devices managed by the processor is an abnormality relating to the external communication.

3. The vehicle abnormality detection device according to claim 1, wherein the vehicle abnormality detection device is provided inside a vehicle.

4. The vehicle abnormality detection device according to claim 1, the processor being further configured to:

manage the first control device and the second control device as abnormality cause control devices, by storing information indicating that the first control device and the second control device are abnormal.

5. A vehicle abnormality detection method performed by a vehicle abnormality detection device implemented with a memory and a processor, comprising:

receiving abnormality information of a first control device in which an abnormality is detected by the vehicle abnormality detection device on an in-vehicle network including a plurality of control devices and configured by a plurality of layers, the vehicle abnormality detection device storing configuration information identifying electronic devices disposed in each layer of the plurality of layers;

acquiring a candidate for a second control device that has a possibility to cause the abnormality of the first control device the first control device and the second control device being disposed within a second layer of the layers;

managing the first control device and the second control device as abnormality cause control devices when an abnormality occurs in the second control device before a time when the abnormality of the first control device is detected by the vehicle abnormality detection device, and acquiring, in response to determining that the abnormality occurring in the second control device is not related to external communication, a candidate for a third control device, disposed within a first layer of the layers adjacent to the second layer, that has a possibility to cause the abnormality in the abnormality cause control devices, in response to the third control device undergoing an abnormality before a time when the abnormality of the abnormality cause control devices is detected by the vehicle abnormality detection device, the third control device is managed as a new abnormality cause control device, wherein the third control device connects the first layer and the second layer, and wherein the vehicle abnormality detection device includes a first vehicle abnormality detection device, and a second vehicle abnormality detection device with a same configuration as the first vehicle abnormality detection device, and one of the first vehicle abnormality detection device and the second vehicle abnormality detection device is determined as being abnormal in response to different detection results being produced by the first vehicle abnormality detection device and the second vehicle abnormality detection device.

* * * * *